US007094179B2

(12) United States Patent
Abe et al.

(10) Patent No.: US 7,094,179 B2
(45) Date of Patent: Aug. 22, 2006

(54) HYDRAULIC TRANSMISSION APPARATUS WITH LOCKUP CLUTCH

(75) Inventors: Hiroya Abe, Saitama (JP); Tetsurou Maruyama, Saitama (JP); Toshitaka Imai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 10/810,726

(22) Filed: Mar. 29, 2004

(65) Prior Publication Data
US 2004/0206592 A1    Oct. 21, 2004

(30) Foreign Application Priority Data
Apr. 16, 2003  (JP)  ............................ 2003-111973

(51) Int. Cl.
   *F16H 61/14* (2006.01)
(52) U.S. Cl. ....................................... 477/169; 477/175
(58) Field of Classification Search ................ 477/169, 477/175; 192/3.29, 3.3
See application file for complete search history.

(56) References Cited

U.S. PATENT DOCUMENTS

| 3,422,940 A | * | 1/1969 | Maurice ................. 192/91 R |
| 3,777,863 A | | 12/1973 | Chana |
| 4,516,671 A | * | 5/1985 | Nishikawa et al. ......... 477/169 |
| 4,693,347 A | * | 9/1987 | Nishikawa et al. ......... 192/3.3 |
| 4,876,922 A | * | 10/1989 | Koshimo .................. 192/3.31 |
| 5,651,752 A | * | 7/1997 | Wakahara et al. .......... 477/175 |
| 5,802,490 A | * | 9/1998 | Droste ....................... 477/169 |
| 2004/0251104 A1 | * | 12/2004 | Abe et al. ................. 192/3.29 |

FOREIGN PATENT DOCUMENTS

| JP | 11-63151 | 3/1999 |
| JP | 11-201260 | 7/1999 |
| JP | 2001-280444 | 10/2001 |

OTHER PUBLICATIONS

Notification of Reason for Refusal dated Jan. 25, 2006.

* cited by examiner

*Primary Examiner*—Sherry Estremsky
(74) *Attorney, Agent, or Firm*—Westerman, Hattori, Daniels & Adrian, LLP.

(57) ABSTRACT

A hydraulic transmission apparatus with a lockup clutch has a pump impeller, a turbine runner, a side cover, a lockup clutch, a clutch piston, a lockup control unit, a frictional engagement unit and a resilient member, a backward movement stopping unit, wherein a transmission capacity of the lockup clutch by virtue of a biasing force of the resilient member is set smaller than a torque absorption capacity of the pump impeller when the engine is in an idle state so that the clutch piston is held at the predetermined backward position by virtue of the pressure difference when the engine is in the idle state.

4 Claims, 4 Drawing Sheets

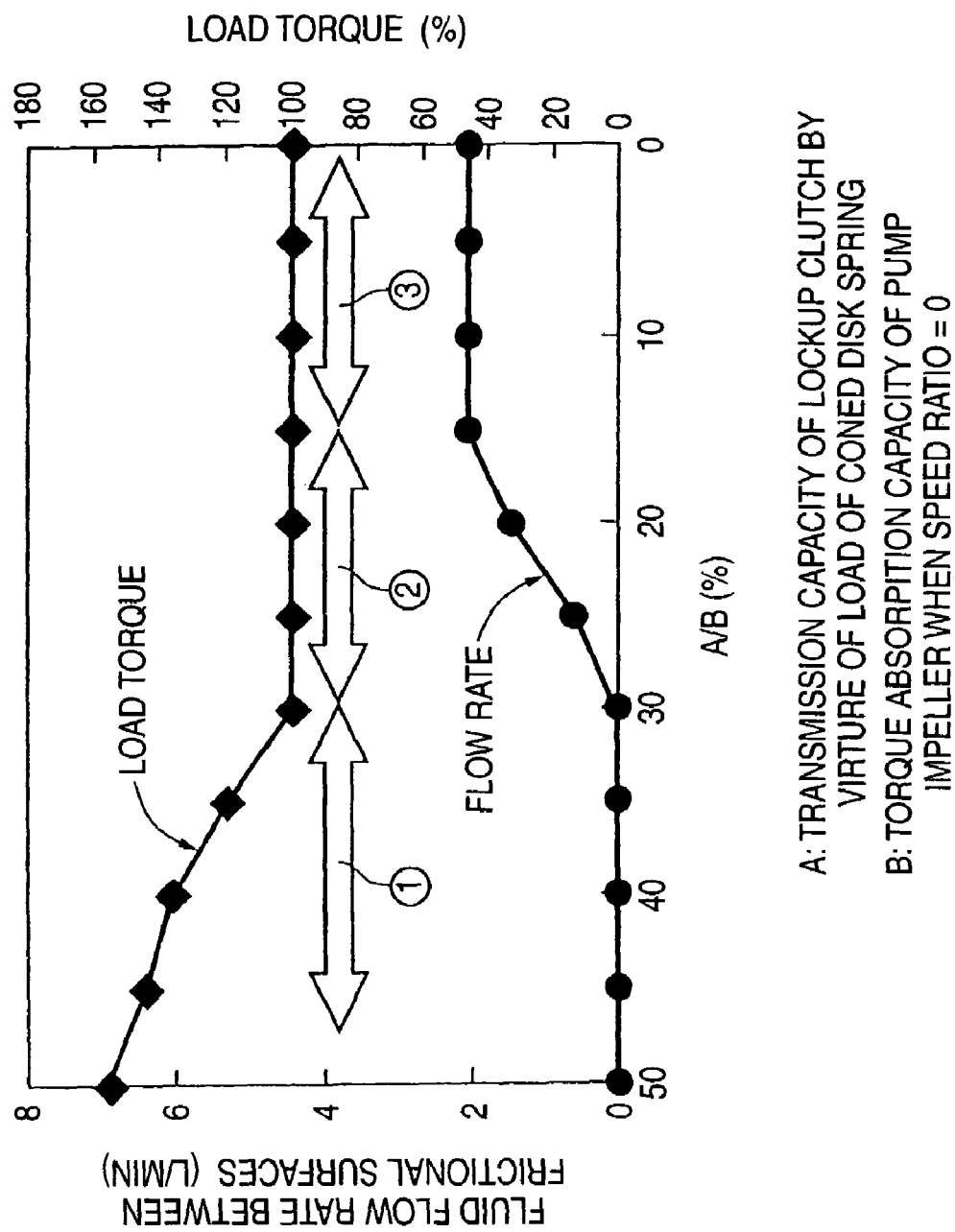

HYDRAULIC TRANSMISSION APPARATUS WITH LOCKUP CLUTCH

BACKGROUND OF THE INVENTION

1. Field of the Invention

The present invention relates to a hydraulic transmission apparatus such as a torque converter and a hydraulic coupling which is used as a power transmission apparatus on vehicles and industrial machines, and more particularly to an improvement on a hydraulic transmission apparatus with a lockup clutch having a pump impeller driven by an engine, a turbine runner forming a circulation circuit between the pump impeller and the turbine runner and driving an output shaft, a side cover provided continuously to the pump impeller so as to form a clutch chamber communicating with an outer circumferential portion of the circulation circuit between an outer surface of the turbine runner and the side cover, a lockup clutch disposed in the clutch chamber so as to establish a direct connection between the side cover and the turbine runner, a clutch piston axially movably coupled to the turbine runner so as to divide the clutch chamber into inner fluid chamber of a turbine runner side and outer fluid chamber of a side cover side, a lockup control unit for generating a pressure difference between the inner fluid chamber and the outer fluid chamber so as to move the clutch piston forwards and backwards relative to an inner surface of the side cover using fluid supplied from an oil pump driven by the engine to the circulation circuit, a frictional engagement unit for establishing and cutting off an engagement between the clutch piston and the side cover in response to forward and backward movements of the clutch piston relative to the inner surface of the side cover and a resilient member disposed between the clutch piston and the turbine runner for biasing the clutch piston in a forward direction

2. Description of the Related Art

The hydraulic transmission apparatus with a lockup clutch has already been known as is disclosed in JP-A-11-63151 for example.

In the hydraulic transmission apparatus with a lockup clutch, the resilient member for biasing the clutch piston in the forward direction is intended to decrease a delay in which the clutch piston moves forwards when the lockup control unit is activated in order to put the lockup clutch in an engaged state to thereby improve the engaging responsiveness of the lockup clutch.

Incidentally, in the conventional hydraulic transmission apparatus with a lockup clutch, since the capacity of the oil pump driven by the engine becomes relatively low, when the engine is at idle, and moreover fluctuates, the receding or backward position of the clutch piston becomes inconstant, and consequently, the cut-off state of the frictional engagement unit becomes inconstant, resulting in a case where a generation of drag torque and a deterioration in fuel consumption may be called for. In addition, the inconstant backward position of the clutch piston means an inconstant forward stroke of the clutch piston, and this means, in turn, that the engaging responsiveness of the lockup clutch becomes inconstant depending on the running conditions of the engine.

SUMMARY OF THE INVENTION

The invention was made in these situations, and an object thereof is to provide a hydraulic transmission apparatus with a lockup clutch which can make constant the backward position of a clutch piston so as to stabilize the cut-off state of a frictional engagement unit and which can, at the same time, make constant at all times the engaging responsiveness of the lockup clutch independent of the running conditions of an engine.

With a view to attaining the object, according to a first aspect of the present invention, there is provided a hydraulic transmission apparatus with a lockup clutch having a pump impeller driven by an engine, a turbine runner forming a circulation circuit between the pump impeller and the turbine runner and driving an output shaft, a side cover provided continuously to the pump impeller so as to form a clutch chamber communicating with an outer circumferential portion of the circulation circuit between an outer surface of the turbine runner and the side cover, a lockup clutch disposed in the clutch chamber so as to establish a direct connection between the side cover and the turbine runner, a clutch piston axially movably coupled to the turbine runner so as to divide the clutch chamber into inner fluid chamber of a turbine runner side and outer fluid chamber of a side cover side, a lockup control unit for generating a pressure difference between the inner fluid chamber and the outer fluid chamber so as to move the clutch piston forwards and backwards relative to an inner surface of the side cover using fluid supplied from an oil pump driven by the engine to the circulation circuit, a frictional engagement unit for establishing and cutting off an engagement between the clutch piston and the side cover in response to forward and backward movements of the clutch piston relative to the inner surface of the side cover, a resilient member disposed between the clutch piston and the turbine runner for biasing the clutch piston in a forward direction and a backward movement stopping unit is provided between the clutch piston and the turbine runner for restricting a predetermined backward position for the clutch piston to put the frictional engagement unit in a cut-off state, wherein a transmission capacity of the lockup clutch by virtue of a biasing force of the resilient member is set smaller than a torque absorption capacity of the pump impeller when the engine is in an idle state so that the clutch piston is held at the predetermined backward position by virtue of the pressure difference when the engine is in the idle state.

According to a second aspect of the present invention as set forth in the first aspect of the present invention, the clutch piston includes a piston outer circumferential-side member having a larger portion of a side wall of the clutch piston located on an outer circumferential side thereof and a piston inner circumferential-side member having a smaller portion of the side wall located on an inner circumferential side thereof and a hub piston protruding from an inner circumferential end of the smaller portion towards the turbine runner, wherein a surface of the hub piston is imparted surface-hardening treatment, wherein the both members fit in each other and are welded together so as to be integral.

According to a third aspect of the present invention as set forth in the second aspect of the present invention, the surface-hardening treatment is carbonitriding or induction hardening.

According to a fourth aspect of the present invention as set forth in the first aspect of the present invention, a capacity ratio satisfies an inequality $A/B \leq 0.15$, wherein A represents the transmission capacity of the lockup clutch and B represents the torque absorption capacity of the pump impeller.

Note that the hydraulic transmission apparatus corresponds to a torque converter T described in an embodiment of the invention which will be described later on, the frictional engagement unit corresponds to a frictional surface 5b and a frictional lining 28, the lockup control unit corresponds to a lockup control valve 42, and the resilient member corresponds to a coned disc spring 33, respectively.

According to the aforesaid feature of the present invention, when the engine is in the idle state, the clutch piston is held at the predetermined backward position at all times, whereby the cut-off state of the frictional engagement unit can be stabilized, thereby making it possible to prevent the generation of a drag torque and the deterioration in fuel consumption. In addition, since the forward stroke of the clutch piston to bring the frictional engagement unit into the engaged state also becomes constant at all times, the engaging responsiveness of the lockup clutch can be enhanced in a stable fashion by making effective use of the biasing force of the resilient member independent of the running conditions of the engine.

BRIEF DESCRIPTION OF THE DRAWINGS

FIG. 4 is a diagram showing a relationship among an A/B ratio, a load torque of the torque converter and an oil flow rate between frictional surfaces of the lockup clutch with a speed ratio of the torque converter=0.

DETAILED DESCRIPTION OF THE PREFERRED EMBODIMENTS

A mode for carrying out the invention will be described below based on an embodiment according to the present invention shown in the accompanying drawings.

Figure 1:
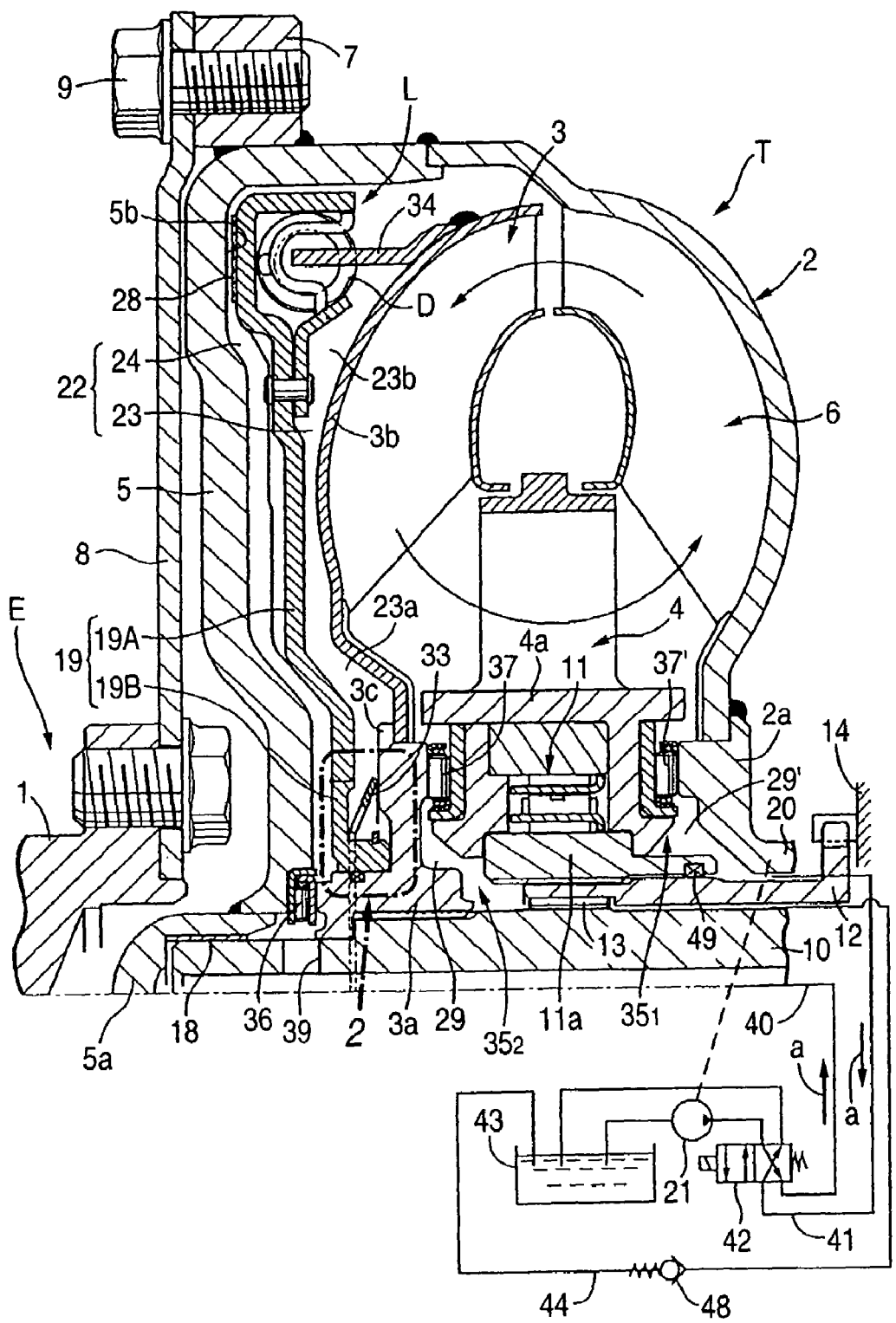
FIG. 1 is a vertical side cross-sectional view showing a torque converter with a lockup clutch according to an embodiment of the present invention with a lockup clutch being released or cut off.
Figure 2:
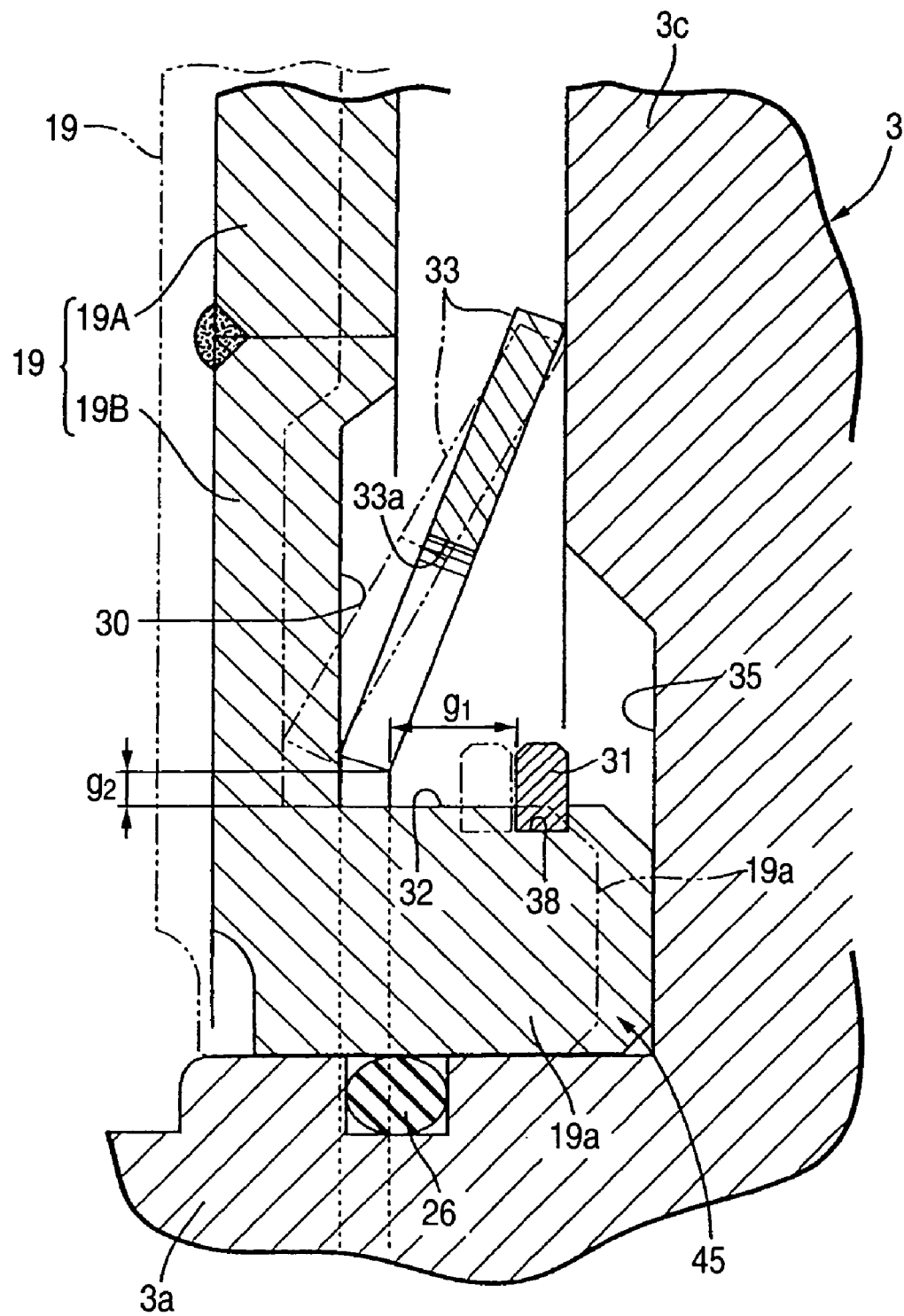
FIG. 2 is an enlarged view of a portion indicated by a thicker and larger reference numeral 2 in FIG. 1.
Figure 3:
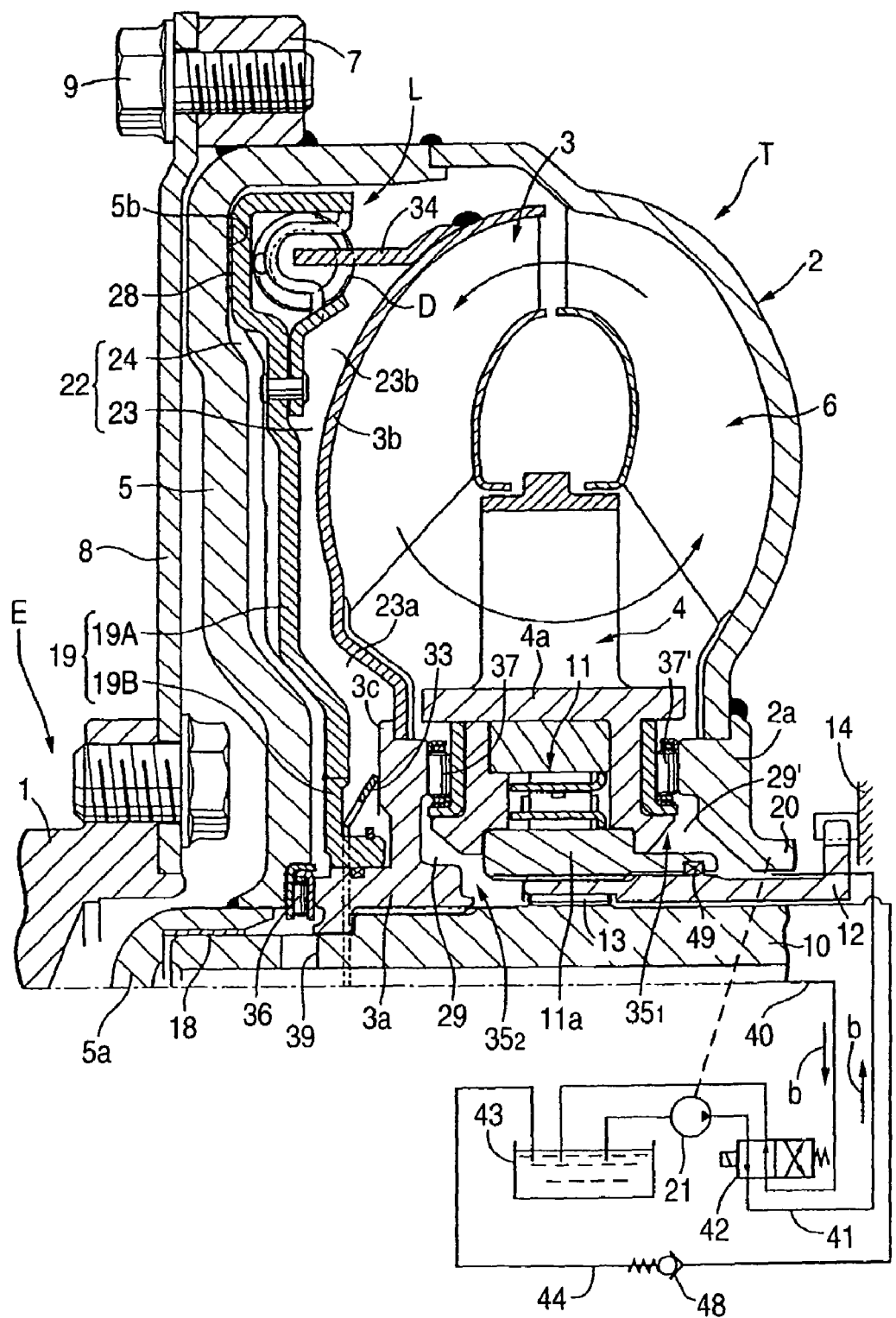
FIG. 3 is a view showing a state in which the lockup clutch is being applied or engaged, which corresponds to FIG. 1

FIG. 1 is a vertical side cross-sectional view showing a torque converter with a lockup clutch according to an embodiment of the present invention with a lockup clutch being released or cut off, FIG. 2 is an enlarged view of a portion indicated by a thicker and larger reference numeral 2 in FIG. 1, FIG. 3 corresponds to FIG. 1 and shows a state in which the lockup clutch is being applied or engaged and FIG. 4 is a diagram showing a relationship among an A/B ratio, a load torque of the torque converter and an oil flow rate between frictional surfaces of the lockup clutch with a speed ratio of the torque converter=0.

Firstly, in FIG. 1, a torque converter T as a hydraulic transmission apparatus includes a pump impeller 2, a turbine runner 3 disposed so as to face the pump impeller 2, and a stator 4 disposed between inner circumferential portions of the pump impeller 2 and the turbine runner 3, and a circulation circuit 6 for power transmission by a fluid between these three members 2, 3, 4.

A side cover 5 which covers an outer surface of the turbine runner 3 is provided integrally and continuously with an outer circumferential portion of the pump impeller 2. A plurality of coupling bosses 7 which are arranged in a circumferential direction are welded to an outer circumferential surface of the side cover 5, and a drive plate 8 connected to a crankshaft 1 of an engine E is fixedly secured to the side cover 5 and hence to the pump impeller 2 with bolts 9. A thrust needle bearing 36 is interposed between a turbine hub 3a at a central portion of the turbine runner 3 and the side cover 5.

An output shaft 10 is disposed at a central portion of the torque converter T in such a manner as to align with the crankshaft 1 coaxially, and this output shaft 10 is spline fitted in the turbine hub 3a and is rotationally supported on a support tube 5a at a central portion of the side cover 5 via a bearing bushing 18. The output shaft 10 constitutes a main shaft of a multi-gear shift transmission, which is not shown.

A cylindrical stator shaft 12 is disposed around an outer circumference of the output shaft 10 which supports a stator hub 4a at a central portion of the stator 4 via a free wheel, and a needle bearing 13 is interposed between the output shaft 10 and the stator shaft 12 for permitting a relative rotation thereof. An outer end portion of the stator shaft 12 is fixedly supported on a transmission case 14 in such a manner as not to permit any rotation.

Thrust needle bearings 37, 37' are interposed between axial end faces of the stator hub 4a and end faces of the respective hubs 2a, 3a of the pump impeller 2 and the turbine runner 3 which so face the axial end faces of the stator hub 4a, respectively, and axial movements of the turbine runner 3 and the stator 4 between the pump impeller 2 and the side cover 5 are restricted by these thrust needle bearings 37, 37' and the thrust needle bearing 36.

In addition, an accessory drive shaft 20 connected to the pump impeller 2 is disposed on an outer circumference of the stator shaft 12 relatively rotationally, and an oil pump 21 for supplying a fluid to the torque converter T is adapted to be driven by the accessory drive shaft 20.

A clutch chamber 22 which communicates with the circulation circuit 6 on an outer circumferential side thereof is defined between the turbine runner 3 and the side cover 5, and a lockup clutch L which can establish a direct connection between the turbine runner 3 and the side cover is provided in the clutch chamber 22. A clutch piston 19 which constitutes a main body of the lockup clutch L is disposed in the clutch chamber 22 in such a manner as to divide the clutch chamber 22 into a turbine runner 3 side inner fluid chamber 23 and a side cover 5 side outer fluid chamber 24. This clutch piston 19 has at a central portion thereof a piston hub 19a which is slidably supported on an outer circumferential surface of the turbine hub 3a via a sealing member 26. In addition, a frictional lining 28 is jointed to one side of the clutch piston 19 in such a manner as to face an annular frictional surface 5b formed on an inner surface of the side cover 5. Additionally, the clutch piston 19 is axially movably coupled to a transmission plate 34 which is fixed to an outer surface of the turbine runner 3.

In FIGS. 1 and 2, the clutch piston 19 includes a piston outer circumferential-side member 19A having a larger portion of a side wall of the clutch piston 19 which is located on an outer circumferential side thereof and a piston inner circumferential-side member 19B having a smaller portion of the side wall which is located on an inner circumferential side thereof and a hub piston 19a which protrudes from an inner circumferential end of the smaller portion towards the turbine runner 3 and imparted a surface hardening treatment such as carbonitriding and induction hardening, and both the members 19A, 19B fit in each other and are then welded together so as to be integral.

As clearly shown in FIG. 2, an annular recessed portion 30 is formed in one side of the piston inner circumferential-side member 19B in such a manner as to open towards the turbine runner 3 side, and an annular mounting groove 32 is defined on an outer circumference of the piston hub 19a by a bottom surface of the annular recessed portion 30 and a circlip 31 which is locked on an outer circumference of a distal end portion of the piston hub 19a. Namely, an inner wall of the mounting groove 32 is made up of the bottom surface of the annular recessed portion 30 and an outer wall thereof is made up of the circlip 31. A coned disc spring 33 is mounted in this mounting groove 32 which functions to bias the clutch piston 19 towards the side cover 5 side when contracted to be provided between the clutch piston 19 and the turbine runner 3. This coned disc spring 33 has a plurality of slits 33a which are each made to open at an inner circumferential edge thereof. Reference numeral 38 denotes a locking groove for the circlip 31 which is formed in the piston hub 19a, and the circlip 31 is mounted in the locking groove 38 after the coned disc spring 33 has been fitted on the outer circumference of the piston hub 19a. According to this construction, the mounting of the coned disc spring 33 in the mounting groove 32 can be facilitated without deforming an inner circumferential end portion of the coned disc spring 33.

The annular recessed portion 30 and the locking groove 38 are machined before a surface hardening treatment is imparted to the piston inner circumferential-side member 19B.

On the other hand, a shell mounting flange 3c to which a turbine shell 3b is attached through welding is formed integrally on the outer circumference of the turbine hub 3a, and an annular recessed portion 35 for receiving the distal end portion of the piston hub 19a is formed in one side of the shell mounting flange 3c, whereby a backward movement stopping unit 45 is constituted by a bottom surface of the annular recessed portion 35 and a distal end face of the piston hub 19a when the bottom surface and the distal end face are brought into abutment with each other which backward movement stopping unit determines in a stable fashion a backward position of the clutch piston 19 towards the turbine runner 3 side when the lockup clutch is put in a clutch off state, that is, when the frictional lining 28 of the clutch piston 19 is separated apart from the frictional surface 5b of the side cover 5 (refer to a portion indicated by chain lines in FIG. 2).

The coned disc spring 33 is provided in a contracted state between the bottom surface of the annular recessed portion 30 in the piston inner circumferential-side member 19B and one side of the annular recessed portion in the shell mounting flange 3c. As this occurs, an axial set load applied to the coned disc spring 33 is set to such a magnitude as to make the frictional lining 28 on the clutch piston 19 press against the frictional surface 5b on the side cover 5 in a state in which no hydraulic pressure is generated in the inner and outer fluid chambers 23, 24 but to permit a movement of the clutch piston 19 towards a clutch off side due to a pressure difference when the hydraulic pressure in the outer fluid chamber 24 exceeds that in the inner fluid chamber 23 by a value equal to or greater than a predetermined value.

Incidentally, the coned disc spring 33 is such as to be displaced slightly axially and radially also at an inner circumferential end portion thereof due to a change in a posture thereof when the coned disc spring 33 deforms in conjunction with an axial movement of the clutch piston, and in the event that the displacement is restrained, the coned disc spring 33 cannot exhibit a predetermined spring characteristic thereof. To cope with this, in order to permit the axial and radial displacement of the inner circumferential end portion of the coned disc spring 33, a gap g1 and a gap g2 are provided between the coned disc spring 33 and the circlip 31 and between the coned disc spring 33 and piston hub 19a, respectively.

Returning to FIG. 1, a first fluid path 40 is provided in a central portion of the output shaft 10 in such a manner as to communicate with the outer fluid chamber 24 of the clutch chamber 22 via a transversal hole 39 and the thrust needle bearing 36. In addition, a second fluid path 41 is defined between the accessory drive shaft 20 and the stator shaft 12, and this second fluid path 41 is made to communicate with the inner circumferential side of the circulation circuit 6 via an annular oil path 29' between the pump hub 2a and the stator hub 4a and the thrust needle bearing 37'.

In addition, a third fluid path 44 is defined between the output shaft 10 and the stator shaft 12, and this third fluid path 44 is made to communicate with the inner circumferential side of the circulation circuit 6 via an annular oil path 29 between the turbine hub 3a and the stator hub 4a and the thrust needle bearing 37. As this occurs, in order to cut off a communication between both the annular fluid paths 29, 29', a sealing member 49 is interposed between an inner race 11a of the free wheel 11.

The first fluid path 40 and the second fluid path 41 are adapted to be alternately connected a discharge side of the oil pump 21 and a fluid reservoir 43 by a lockup control valve 42. In addition, the first fluid path 40 and the second fluid path 41 are connected to the fluid reservoir 43 via relief valve 48 which maintains the circulation circuit 6 and a primary inner fluid chamber 23a to predetermined fluid pressures.

Thus, in the event that the lockup control valve 42 is controlled such that a fluid discharged by the oil pump 21 is supplied into the circulation circuit 6 from the outer fluid chamber 24 via the inner fluid chamber 23 of the clutch chamber 22, a pressure difference is generated between the outer fluid chamber 24 and the inner fluid chamber 23 which presses the clutch piston 19 towards a backward direction. Specifications of respective involved portions are set such that a backward moving force of the clutch piston 19 resulting due to the pressure difference exceeds a forward moving force of the clutch piston 19 resulting by virtue of the set load off the coned disc spring 33 at all times, in particular, when the engine E is in an idle state. To be specific, a transmission capacity A of the lockup clutch resulting by the set load of the coned disc spring 33 is set smaller than a torque absorption capacity of the pump impeller 2 when the engine E is in the idle state, and it is ideal that the capacities A and B are set such that a ratio between A and B is equal to or less than 15%.

Next, the function of the embodiment will be described.

When the engine E is in the idle state, that is, in a state in which the speed ratio of the torque converter T is 0, as shown in FIG. 1, the lockup control valve 42 is controlled by an electronic control unit, which is not shown, such that the first fluid path 40 is connected to the discharge side of the oil pump 21, whereas the second fluid path 41 is connected to the fluid reservoir 43. Consequently, when an output torque of the engine E is transmitted to the drive plate 8, the side cover 5 and the pump impeller 2 to thereby rotationally drive the pump impeller 2 and furthermore the oil pump 21 as well, the fluid discharged by the oil pump 21 flows as indicated by arrows "a" and then flows into the circulation circuit 6 from the lockup control valve 42 via the first fluid path 40, the transversal hole 39 and the thrust needle bearing 36, the outer fluid chamber 24 and the inner fluid chamber 23 of the clutch chamber 22 in a sequential fashion to thereby fill the circulation circuit 6. Thereafter, the fluid moves to the second fluid path 41 via the thrust needle bearing 37' and the annular fluid path 29' and then returns to the fluid reservoir 43 from the lockup control valve 42.

Thus, in the clutch chamber 22, the pressure in the outer fluid chamber 24 increases higher than that in the inner fluid chamber 23 due to the flow of the fluid as has been described heretofore, and since the clutch piston 19 moves backwards by virtue of a pressure difference so generated in such a manner as to be separated apart from the frictional surface 5b of the side cover 5 against the set load of the coned disc spring 33, the lockup clutch is put in a cut off state to thereby permit a rotational slippage between the pump impeller 2 and the turbine runner 3.

FIG. 4 shows a load torque (including a drag torque of the lockup clutch L and the absorption capacity of the torque converter T) and fluid flow rate between the frictional surfaces of the lockup clutch L when the set load of the coned disc spring 33 is changed in a state in which the speed ratio of the torque converter T is 0. Here, the load torque indicates that the lockup clutch is generating a drag when the load torque exceeds 100% with a capacity value which is generated by the slippage of the torque converter T being regarded as 100%.

In FIG. 4, an axis of abscissas indicates the ratio of A/B, that is the ratio between the transmission capacity A of the lockup clutch L which is generated by the load of the coned disc spring 33 and the torque absorption capacity B of the pump impeller 2 when the engine E is in the idle state, and an axis of ordinates indicates an oil flow rate and load torque between the frictional surfaces of the lockup clutch L. Here, the transmission capacity of the lockup clutch that is generated by the load of the coned disc spring 33 means a clutch capacity which can be generally calculated from an effective pressure receiving surface of the clutch piston 19, an effective radius of the clutch piston 19 and a frictional coefficient.

As is clear from FIG. 4, in the event that the load of the coned disc spring 33 is high and the transmission capacity A of the lockup clutch is large with respect to the torque absorption capacity of the pump impeller 2, the clutch piston 19 cannot be moved backwards from the clutch connected or engaged position even with the fluid, and as shown in an area ① in FIG. 4, the load torque is large and no fluid flows into the clutch chamber 22.

As shown in an area ②, as the load of the coned disc spring 33 is lowered, the clutch piston 19 starts to move backwards, and a state is reached where the transmission capacity A of the lockup clutch L becomes balanced with the torque absorption capacity B of the pump impeller 2. However, since the clutch piston 19 has not moved backwards sufficiently, a gap between the frictional lining 28 and the frictional surface 5b remains narrow and the fluid flow rate therebetween remains small. Consequently, no sufficient pressure difference to move the clutch piston backwards has been generated between the inner fluid chamber 23 and the outer fluid chamber 24.

Now, as shown in an area ③, in the event that the load of the coned disc spring 33 is lowered further down so that the A/B ratio becomes equal to or less than 15% as set according to the present invention, the clutch piston 19 moves backwards sufficiently until it is held at the predetermined backward position which is restricted by the backward movement stopping unit 45 (refer to FIG. 2). As a result, the gap between the frictional lining 28 and the frictional surface 5b is expanded maximum, and the flow rate of fluid therebetween is increased, whereby a pressure difference which is sufficient to hold the clutch piston 19 at the backward position is generated between the inner fluid chamber 23 and the outer fluid chamber 24. As a result, the fluid flow rate becomes stabilized, whereby the cut-off state of the lockup clutch becomes, in turn, stable, thereby making it possible to prevent the generation of drag torque and deterioration in fuel consumption.

In addition, it has been confirmed that when the A/B ratio becomes equal to or less than 15%, there occurs no deterioration in fuel consumption in the torque converter T in the idle condition.

Additionally, in the state in which the clutch piston 19 is held at the predetermined backward position, that is, in a state in which the distal end face of the piston hub 19a is in abutment with the bottom surface of the annular recessed portion 35 in the shell mounting flange 3c of the turbine runner 3, the axial deformation amount of the coned disc spring 33 resulting when the clutch piston 19 moves backwards is suppressed to a constant level. Consequently, even if the pressure difference between the outer fluid chamber 24 and the inner fluid chamber 23 rises to a level which is equal to or greater than the predetermined value, the application of an excessive axial load to the coned disc spring 33 can be avoided.

Next, in the event that the transmission capacity of the torque converter T increases as the rotational speed of the crankshaft 1 increases, the fluid which fills the circulation circuit 6 circulates as indicated by an arrow, whereby the rotational torque of the pump impeller 2 is transmitted to the turbine runner 3 to thereby drive the output shaft 10.

As this occurs, in case a torque amplifying action is occurring between the pump impeller 2 and the turbine runner 3, a reaction force resulting in conjunction with the action is borne by the stator 4, and the stator 4 is fixed by a locking action of the free wheel 11.

Next, when the lockup control valve 42 is changed over to a state shown in FIG. 3 by the electronic control unit so that the lockup clutch L is put in the connected or engaged state when coupling the torque converter T or applying an engine brake, the fluid discharged by the oil pump 21 flows as indicated by arrows "b" in an opposite direction to the direction before and flows into the circulation circuit 6 from the lockup control valve 42 via the second fluid path 41, the annular fluid path 29', and the thrust needle bearing 37' in a sequential fashion, the fluid then flowing also into the inner fluid chamber 23 of the clutch chamber from the outer circumferential side. On the other hand, the outer fluid chamber 24 of the clutch chamber 22 is made to open to the fluid reservoir 43 via the first fluid path 40 and the lockup control valve 42. As a result, while the pressure in the inner fluid chamber 23 increases, whereas the pressure in the outer fluid chamber 24 decreases, since the clutch piston 19 is biased towards the side cover 5 side by the set load of the coned disc spring 33, the clutch piston 19 starts to move forwards towards a clutch on side so that the frictional lining 28 is brought into press contact with the frictional surface 5b of the side cover 5 immediately a stage has been realized in which the pressures of both the fluid chambers 23, 24 reach substantially the same pressure. According to the press contact like this, since a leakage of the fluid from the inner fluid chamber 23 to the outer fluid chamber 24 is prevented, the increase in pressure in the inner fluid chamber 23 is implemented efficiently and quickly when the fluid flows into the inner fluid chamber 23 from the circulation circuit 6, whereby the clutch piston 19 is made to press against the frictional surface 5b side of the side cover 5 quickly and strongly.

As this occurs, since, in particular, the clutch piston 19 moves forwards from the predetermined backward position, the forward stroke thereof stays constant at all times, and consequently, independent of the running conditions of the engine E, the clutch piston can make effective use of the set load of the coned disc spring 33, whereby the frictional lining 28 can be brought into engagement with the frictional surface 5b quickly. Thus, the engaging responsiveness of the lockup clutch L can be enhanced stably and a slippage between the pump impeller 2 and the turbine runner 3 can be prevented immediately, which can contribute to the improvement in transmission efficiency and then to the improvement in fuel consumption.

The invention is not limited to the embodiment that has been described heretofore but can be modified variously without departing from the spirit and scope thereof. For example, the invention can be applied to a hydraulic coupling without a stator 4.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

As has been described heretofore, according to the present invention, there is provided the hydraulic transmission apparatus with a lockup clutch having a pump impeller driven by an engine, a turbine runner forming a circulation circuit between the pump impeller and the turbine runner and driving an output shaft, a side cover provided continuously to the pump impeller so as to form a clutch chamber communicating with an outer circumferential portion of the circulation circuit between an outer surface of the turbine runner and the side cover, a lockup clutch disposed in the clutch chamber so as to establish a direct connection between the side cover and the turbine runner, a clutch piston axially movably coupled to the turbine runner so as to divide the clutch chamber into inner fluid chamber of a turbine runner side and outer fluid chamber of a side cover side, a lockup control unit for generating a pressure difference between the inner fluid chamber and the outer fluid chamber so as to move the clutch piston forwards and backwards relative to an inner surface of the side cover using fluid supplied from an oil pump driven by the engine to the circulation circuit, a frictional engagement unit for establishing and cutting off an engagement between the clutch piston and the side cover in response to forward and backward movements of the clutch piston relative to the inner surface of the side cover, a resilient member disposed between the clutch piston and the turbine runner for biasing the clutch piston in a forward direction and a backward movement stopping unit is provided between the clutch piston and the turbine runner for restricting a predetermined backward position for the clutch piston to put the frictional engagement unit in a cut-off state, wherein a transmission capacity of the lockup clutch by virtue of a biasing force of the resilient member is set smaller than a torque absorption capacity of the pump impeller when the engine is in an idle state so that the clutch piston is held at the predetermined backward position by virtue of the pressure difference when the engine is in the idle state. Consequently, when the engine is in the idle state, the clutch piston is allowed at all times to be held at the predetermined backward position, whereby the cut-off state of the frictional engagement unit can be stabilized, thereby making it possible to prevent the generation of drag torque and deterioration in fuel consumption. In addition, the forward stroke of the clutch piston to bring the frictional engagement unit into the engagement state becomes constant, the engaging responsiveness of the lockup clutch can be enhanced stably by making effective use of the biasing force of the resilient member independent of the running conditions of the engine.

What is claimed is:

1. A hydraulic transmission apparatus with a lockup clutch comprising:

a pump impeller driven by an engine;

a turbine runner forming a circulation circuit between the pump impeller and the turbine runner and driving an output shaft;

a side cover provided continuously to the pump impeller so as to form a clutch chamber communicating with an outer circumferential portion of the circulation circuit between an outer surface of the turbine runner and the side cover;

a lockup clutch disposed in the clutch chamber so as to establish a direct connection between the side cover and the turbine runner;

a clutch piston axially movably coupled to the turbine runner so as to divide the clutch chamber into inner fluid chamber of a turbine runner side and outer fluid chamber of a side cover side;

a lockup control unit for generating a pressure difference between the inner fluid chamber and the outer fluid chamber so as to move the clutch piston forwards and backwards relative to an inner surface of the side cover using fluid supplied from an oil pump driven by the engine to the circulation circuit;

a frictional engagement unit for establishing and cutting off an engagement between the clutch piston and the side cover in response to forward and backward movements of the clutch piston relative to the inner surface of the side cover;

a resilient member disposed between the clutch piston and the turbine runner for biasing the clutch piston in a forward direction; and a backward movement stopping unit is provided between the clutch piston and the turbine runner for restricting a predetermined backward position for the clutch piston to put the frictional engagement unit in a cut-off state, wherein a transmission capacity of the lockup clutch by virtue of a biasing force of the resilient member is set smaller than a torque absorption capacity of the pump impeller when the engine is in an idle state so that the clutch piston is held at the predetermined backward position by virtue of the pressure difference when the engine is in the idle state.

2. A hydraulic transmission apparatus with a lockup clutch as set forth in claim 1, wherein the clutch piston includes:

a piston outer circumferential-side member having a larger portion of a side wall of the clutch piston located on an outer circumferential side thereof; and a piston inner circumferential-side member having:

a smaller portion of the side wall located on an inner circumferential side thereof; and a hub piston protruding from an inner circumferential end of the smaller portion towards the turbine runner, wherein a surface of the hub piston is imparted surface-hardening treatment, wherein the both members fit in each other and are welded together so as to be integral.

3. A hydraulic transmission apparatus with a lockup clutch as set forth in claim 2, wherein the surface-hardening treatment is carbonitriding or induction hardening.

4. A hydraulic transmission apparatus with a lockup clutch as set forth in claim 1, wherein a capacity ratio satisfies an inequality;

$$A/B \leq 0.15$$

wherein A represents the transmission capacity of the lockup clutch and B represents the torque absorption capacity of the pump impeller.

* * * * *